(12) United States Patent
Stephan et al.

(10) Patent No.: US 6,199,798 B1
(45) Date of Patent: Mar. 13, 2001

(54) DEVICE FOR RELEASABLY FASTENING COVERING PANELS

(75) Inventors: Walter A. Stephan, St.Martin; Hermann Filsegger, Ried im Innkreis, both of (AT)

(73) Assignee: Fischer Advanced Composite Components Gesellschaft m.b.H., Ried im Innkreis (AT)

( * ) Notice: Subject to any disclaimer, the term of this patent is extended or adjusted under 35 U.S.C. 154(b) by 0 days.

(21) Appl. No.: 09/111,060

(22) Filed: Jul. 7, 1998

(30) Foreign Application Priority Data

Jul. 7, 1997 (AT) .................................................. 1162/97

(51) Int. Cl.[7] ........................................................ B64C 1/14
(52) U.S. Cl. ........................ 244/129.4; 244/119; 52/220.2
(58) Field of Search ..................................... 244/119, 120, 244/118.2, 129.4, 132; 439/450; 248/27.1; 52/220.1, 220.2

(56) References Cited

U.S. PATENT DOCUMENTS

| 3,742,674 | * | 7/1973 | Lang | 52/666 |
| 4,050,208 | * | 9/1977 | Pompei et al. | 52/460 |
| 4,739,955 | * | 4/1988 | Aquino et al. | 244/129.4 |
| 5,014,934 | | 5/1991 | McClaflin | 244/132 |
| 5,822,935 | * | 10/1998 | Mitchell et al. | 52/239 |

FOREIGN PATENT DOCUMENTS

| 2 243 661 | 7/1973 | (DE) . |
| 3 626 514 | 2/1988 | (DE) . |
| 3 900 468 | 7/1990 | (DE) . |
| 4 032 565 | 4/1992 | (DE) . |
| 4 138 047 | 6/1992 | (DE) . |

* cited by examiner

Primary Examiner—Robert P. Swiatek
(74) Attorney, Agent, or Firm—Jacobson, Price, Holman & Stern, PLLC

(57) ABSTRACT

A device for releasably fastening covering panels, in particular ceiling panels in aircraft, on a load-bearing structure, having at least two fastening elements. In order to make it possible for the covering panels to be removed and fastened quickly and easily without the aid of tools, and for loose constituent parts to be avoided, it is provided that all the constituent parts of the fastening elements are connected either to the covering panel and/or to the load-bearing structure, and that all those constituent parts of the fastening elements which are connected to the covering panel are arranged exclusively on that side of the covering panel which is directed toward the load-bearing structure, and that at least one fastening element is designed as a movable bearing, e.g. as a bolt, for absorbing the forces which act essentially perpendicularly with respect to the covering panel, and at least one fastening element is designed as a fixed bearing, e.g. as a bolt, for additionally absorbing the forces which act essentially in the direction of the covering panel, and that each fastening element which is designed as a fixed bearing has means for tool-free locking and unlocking.

14 Claims, 9 Drawing Sheets

DEVICE FOR RELEASABLY FASTENING COVERING PANELS

FIELD OF THE INVENTION

The invention relates to a device for releasably fastening covering panels or the like, in particular ceiling panels in aircraft, on a load-bearing structure, having at least two fastening elements.

DESCRIPTION OF RELATED ART

The term covering panels covers all elements which serve for forming walls, for example in the aircraft interior, and are intended to cover equipment located behind them. The covering panels may be in a wide range of sizes and shapes. It is necessary for the equipment and systems which are located behind the covering panels to be rendered easily accessible, in order for it to be possible for these to be serviced, or, in the case of the defect, repaired and/or exchanged. Conventional covering panels can usually only be removed with relatively high outlay, with the use of tools. This renders, in particular, the task of trouble-shooting a high-outlay and time-consuming undertaking. The visible side of the covering panel often has holes via which the fastening elements can be released, for example by means of a screwdriver. For esthetic reasons, the holes, of course, are kept as small as possible, which, in turn, means that, on the one hand, the task of positioning the screwdriver precisely requires a greater amount of skill and more time and, on the other hand, incorrect positioning of the tool results in damage to the covering panel in the region of the opening. Furthermore, it is not possible to prevent unauthorized individuals from opening the fastening elements, and thus removing the covering panels.

SUMMARY OF THE INVENTION

The object of the invention is to provide measures which make it possible for the covering panels to be removed and fastened quickly and easily without the aid of tools, the abovementioned disadvantages being avoided in the process. Loose constituent parts, which could get lost during installation and removal, are intended to be avoided.

This object is achieved according to the invention in that all the constituent parts of the fastening elements are connected either to the covering panel and/or to the load-bearing structure, and in that all those constituent parts of the fastening elements which are connected to the covering panel are arranged exclusively on that side of the covering panel which is directed toward the load-bearing structure, and in that at least one fastening element is designed as a movable bearing for absorbing the forces which act essentially perpendicularly with respect to the covering panel, and at least one fastening element is designed as a fixed bearing for additionally absorbing the forces which act essentially in the direction of the covering panel, and in that the, or each, fastening element which is designed as a fixed bearing has means for tool-free locking and unlocking. Since all the constituent parts of the fastening elements are connected either to the covering panel and/or to the load-bearing structure, this means that loose parts are avoided during installation or removal. Loose parts can cause aggravating noise or else may constitute a source of danger, in particular in the aircraft. Since all those constituent parts of the fastening elements which are connected to the covering panel are arranged, according to the invention, exclusively on that side of the covering panel which is directed toward the load-bearing structure, that side which is visible when the covering panel is in the fastened state does not have any holes or slots for access to the fastening elements. In addition to advantages from an esthetic point of view, the advantages of better cleaning, the avoidance of damage caused by the tool to be inserted into the holes or slots and the avoidance of unauthorized opening of the fastening means should also be mentioned. The covering panel is suspended on the load-bearing structure via the, or each, movable bearing and is fixed via the, or each, fixed bearing, it being possible for the fixing arrangement to be locked and then unlocked in a tool-free manner. This permits quicker and more straightforward servicing, for example of the aircraft, and it is possible to prevent delays in take-off which are caused by lengthy servicing operations.

Advantageously, all the fastening elements are arranged on the borders of the covering panel. On the one hand, this achieves optimum distribution of the forces and, on the other hand, this permits better access to the means for locking and unlocking the fastening elements which are designed as fixed bearings.

If each fastening element which is designed as a movable bearing is arranged on one border side of the covering panel and each fastening element which is designed as a fixed bearing is arranged on the opposite border side of the covering panel, this permits straightforward installation and removal and, furthermore, optimum servicing of the equipment located behind the covering panel. Thus, in the case of trouble-shooting or inspection, all that is required is for the fastening elements which are designed as fixed bearings to be opened by tool-free actuation of the means for locking and unlocking, while the fastening elements which are designed as movable bearings do not have to be actuated. For example, once the fixed bearings have been opened, the covering panel is swung open by an admissible amount, the equipment located behind the panel is inspected and, if appropriate, serviced, and the panel is then swung closed again. Since the covering panel does not have to be removed during the servicing operations, quicker servicing is possible. Furthermore, there is no disruption caused by the covering panels which have been removed lying around, which would cause problems, in particular, in the constricted area within an aircraft.

According to a further feature of the invention, each fastening element which is designed as a movable bearing is formed by a bolt or the like, which is fixedly connected to the covering panel and can be suspended in a bearing block or the like which is fixedly connected to the load-bearing structure, and each fastening element which is designed as a fixed bearing is designed as a snap-action closure, which can be opened in a tool-free manner. This constitutes a preferred method of implementing the present invention.

Advantageously, the fixed bearing, which is designed as a snap-action closure, can be opened in a tool-free manner by a turning lever which is accessible from the side of the covering panel. For example, straightforward turning of the turning lever using the fingers can unlock the fastening of the covering panel. For this purpose, all that is required is for the member of servicing staff to slide his/her hand along the border side of the covering panel and move the turning lever into the corresponding unlocking position. This allows servicing to be carried out very quickly and easily. In order that it can better be seen, the turning lever may be marked with a conspicuous color, for example red.

A further feature of the invention provides a restoring spring or the like which acts on the turning lever and by means of which, in the open state of the snap-action closure, the turning lever can be moved into an unlocking position. This measure allows the servicing staff to recognize, by the position of the turning lever, whether the snap-action closure of the fixed bearing is opened or locked. It is only when the snap-action closure is properly closed, that is to say when the covering panel is properly fastened on the load-bearing structure, that the turning lever is located in the locked position. Otherwise, the turning lever is forced into the unlocked position by the restoring spring or the like.

According to a variant of this, in order to protect against undesired actuation in the position in which the snap-action closure is locked, the turning lever may have retaining means, it being possible, by overcoming these retaining means, for the turning lever to be moved into a position in which the snap-action closure is unlocked. On the one hand, this makes it easier to find the locked position by virtue of the retaining means latching in and, on the other hand, this means that undesired unlocking, for example caused by vibration, can be avoided. The retaining means can be realized by a wide range of designs, for example by a resiliently mounted ball which, in the locked position, projects in part into a corresponding hole or a depression.

In order to avoid damage to components, and injury to the servicing staff, by the covering panel being swung down too far, a further feature of the invention provides that at least one retaining cable or the like is fastened, by one end in each case, on the covering panel or component connected thereto and, by the other end in each case, on the load-bearing structure or a component connected thereto, and that the fastenings of the, or each, retaining cable or the like can be opened in a tool-free manner. This means that, when the fixed bearing is open, the covering panel is borne by the, or each, retaining cable, as a result of which the member of servicing staff's hand is free for other purposes. Should the covering panel be removed, the, or each, retaining cable can be released quickly and easily without the aid of tools.

In order to avoid vibrations, and the resulting development of noise, in particular in the aircraft, the fastening elements, according to a further feature of the invention, have means for damping vibrations, for example damping rings made of elastic material, springs or the like. In order to avoid loose parts, these damping means too are connected to the fastening elements.

If there are provided on the fastening elements means for releasably connecting the covering panel to adjoining covering panels or the like, arrangements which comprise a plurality of covering panels, or attachments of the covering panels to existing or adjoining structures, can be realized in optimum fashion. For example, side panels can thereby be connected to the ceiling panels.

According to a straightforward design variant, these means for releasably connecting the covering panel to adjoining covering panels or the like can be formed by spring elements. Thus, for example, a lamp covering adjoining the ceiling panel in the aircraft can be pressed onto the ceiling panel by the spring element, e.g. a plate spring, and can thus be fixed in its desired position. In order to remove the ceiling panel, the lamp covering, by overcoming the spring force this [sic] plate spring, can be pushed laterally out of its position, this resulting in a gap being left between the lamp covering and ceiling panel, with the result that, for example, the turning lever can be actuated for the purpose of unlocking the fixed bearing.

BRIEF DESCRIPTION OF THE DRAWINGS

The invention will be described in more detail with reference to the attached figures, which show exemplary embodiments of an inventive device for fastening ceiling panels for the purpose of lining an aircraft interior, and in which.

DESCRIPTION OF THE PREFERRED EMBODIMENTS

Figure 1:
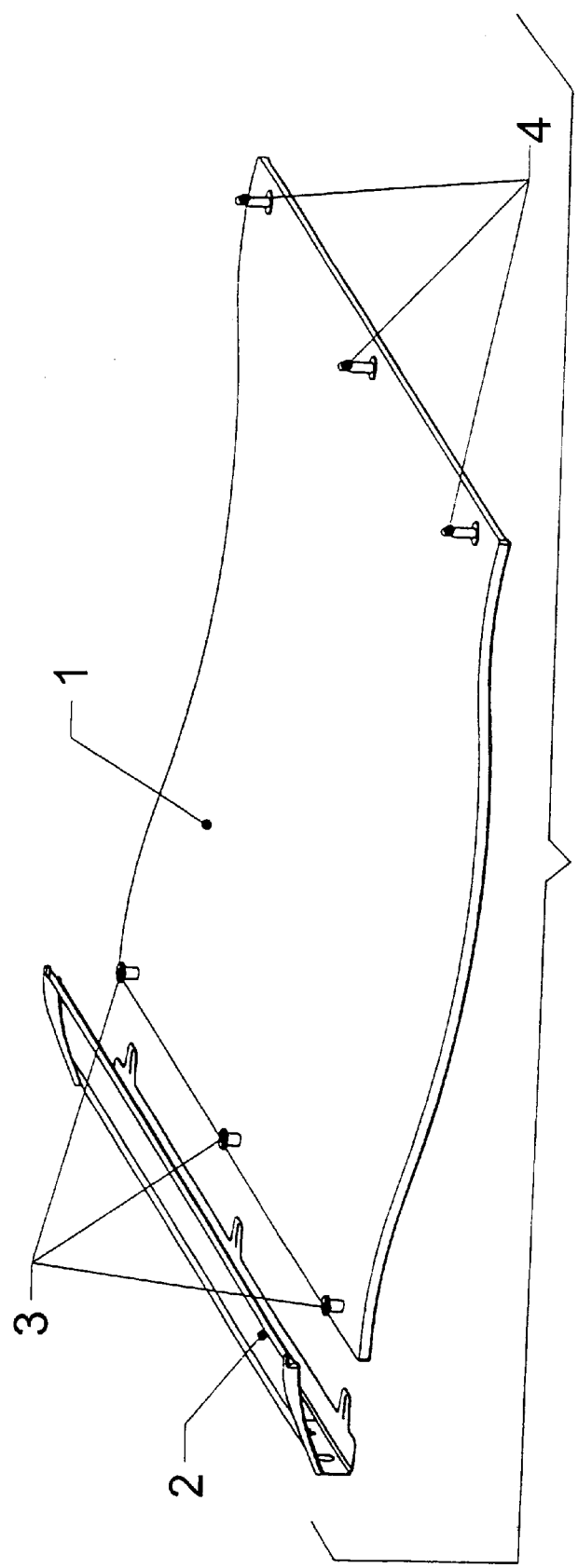
FIG. 1 shows a perspective view of a ceiling panel provided with the device according to the invention and of an adjoining lamp covering.

FIG. 1 illustrates a perspective view of a ceiling panel 1 for forming the interior of an aircraft. The ceiling panel 1 illustrated serves for covering the ceiling region of the aircraft interior above the aisle between the rows of seats. The ceiling panel 1 may be laterally adjoined by a side panel 2, which may be formed, for example, such that it serves as a covering for the lamps for illuminating the aircraft interior. The side panel 2 is usually adjoined at the bottom by the stowage box (not illustrated). It is likewise possible for the right-hand side of the ceiling panel 1 to be adjoined by a side panel in the form of a lamp covering (not illustrated). According to the invention, one border side of the ceiling panel 1 is provided with fastening elements which permit movable mounting of the ceiling panel 1 on a load-bearing structure which is usually fitted on the fuselage. In the example illustrated, the fastening elements are in the form of bolts 3, which are fastened in complementary elements on the load-bearing structure, with the result that the bolts 3 essentially only absorb forces which act vertically, as a result of which the ceiling panel 1 is more or less suspended on the fuselage by the bolts 3. Preferably arranged on the opposite border side of the ceiling panel 1 are fastening elements which permit fixed mounting of the ceiling panel 1 on the load-bearing structure. The fastening elements of this fixed bearing are in the form of bolts 4, which are fastened on complementary elements such that the bolts 4 also absorb forces in the direction of the ceiling panel 1. The invention provides means on the fixed-bearing side which make it possible for the fastenings of the bolts 4 to be opened in a tool-free manner. In the exemplary embodiment illustrated, in each case three bolts 3 are arranged on the movable-bearing side and three bolts 4 are arranged on the fixed-bearing side, the bolts 3 and 4 in each case being arranged on one border side of the ceiling panel 1 so as to follow one after the other in the direction of travel, it being the case that the bolts 3 of the movable bearing are advantageously remote from the longitudinal center of the passenger compartment, this making it more straightforward to service the equipment located behind the ceiling panel 1. For installation of a ceiling panel 1 according to this embodiment, the bolts 3 of the movable bearing are suspended, or the like, in the corresponding devices on the load-bearing structure and, thereafter, the ceiling panel 1 is swung, with the bolts 4 of the fixed bearing, onto the corresponding fastening devices and locked automatically or manually. The bolts 3, 4 are fixedly connected, for example adhesively bonded or screwed, to the ceiling panel 1. That side of the ceiling panel 1 which is visible from the interior of the aircraft does not have any openings or the like for the purpose of actuating the fastening devices, this improving the esthetic appearance, facilitating cleaning and preventing unauthorized removal.

The term panel is to be understood in its widest sense and may be designed as any desired covering panel whose task is to cover equipment, units or the like in a basic or load-bearing structure and, if need be, to close off the same flush with a covering wall or the like.

Figure 2A:
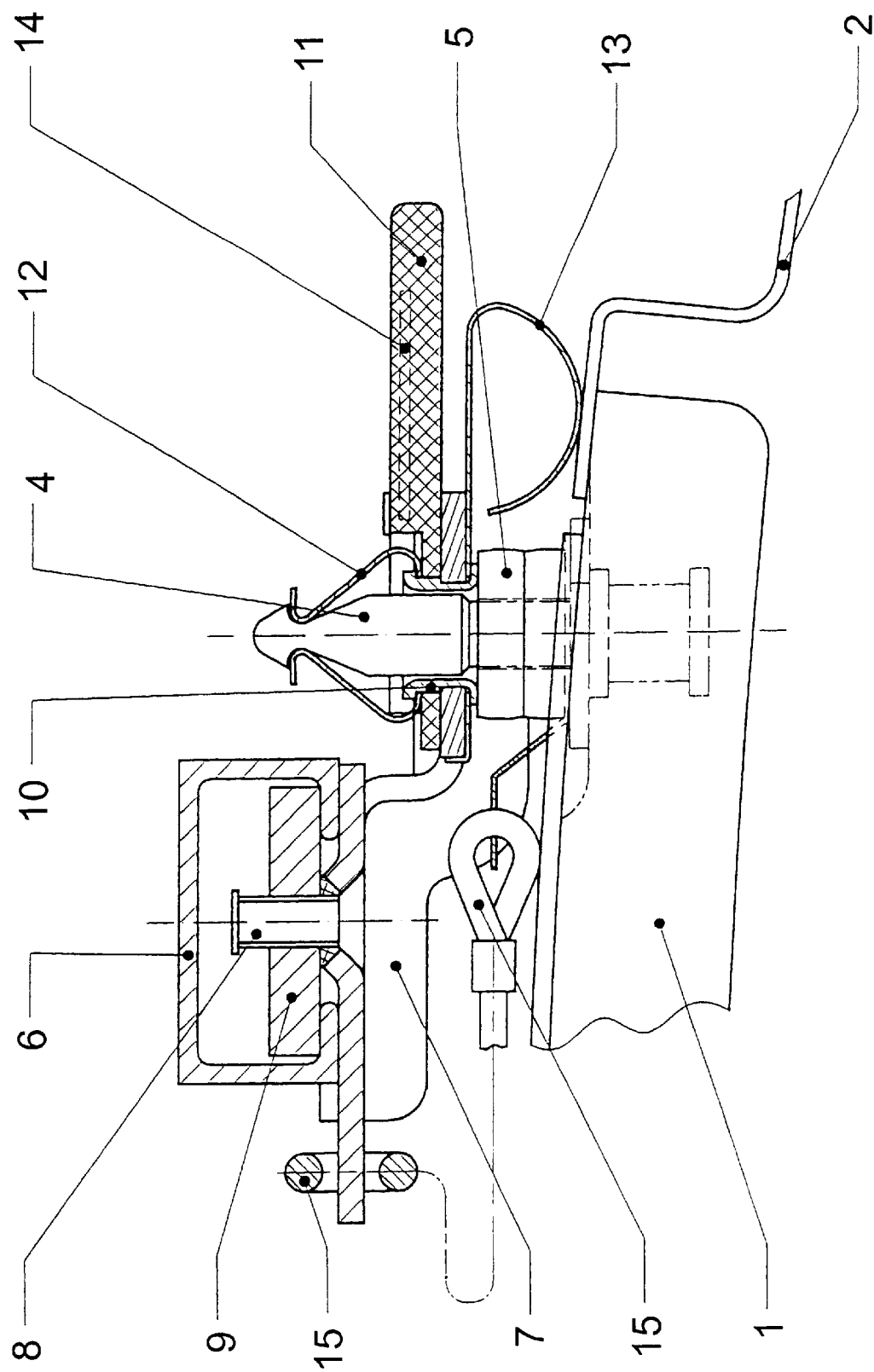
FIG. 2a shows an embodiment of a fixed bearing in vertical section.
Figure 2B:
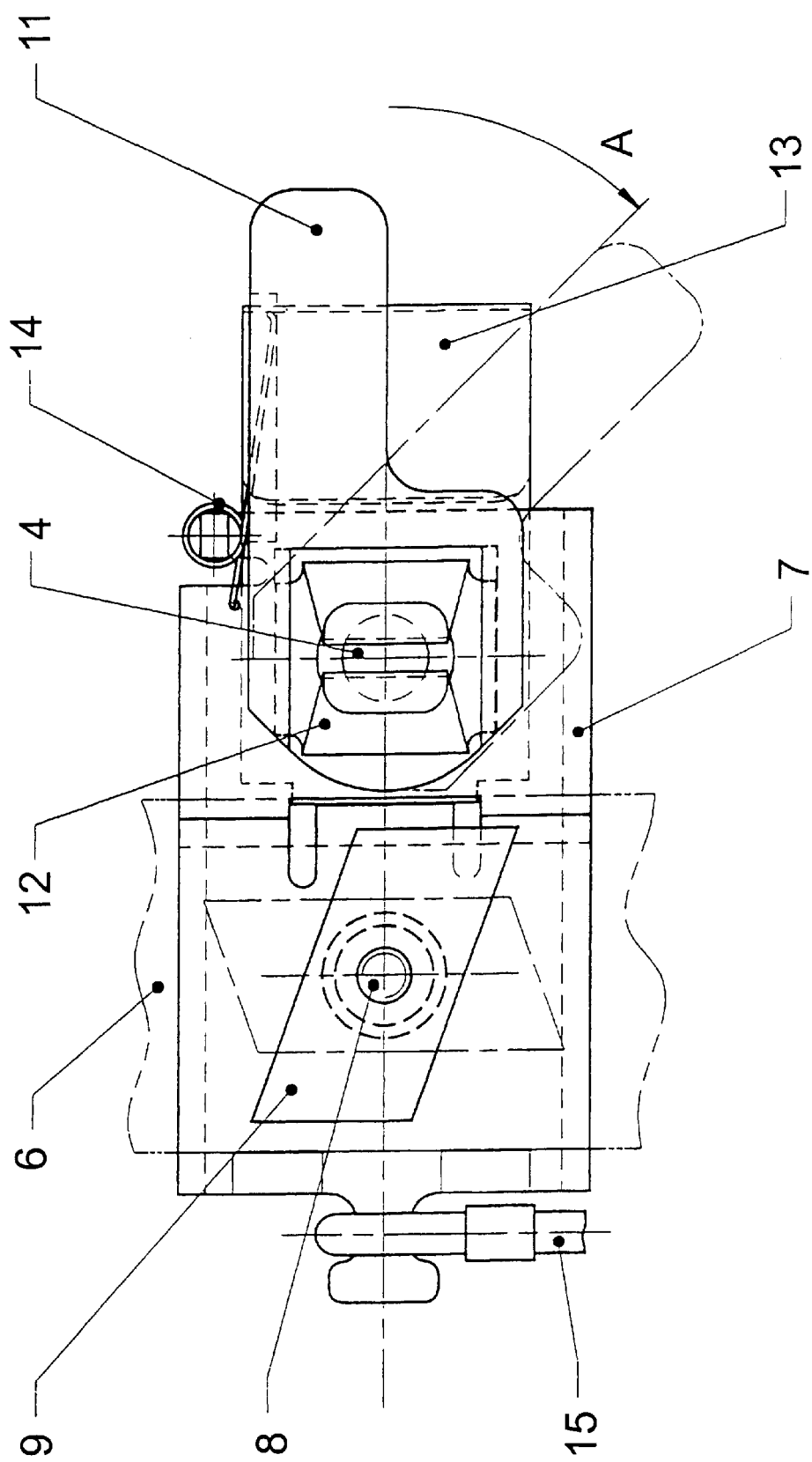
FIG. 2b shows the fixed bearing according to FIG. 2a, in plan view.
Figure 2C:
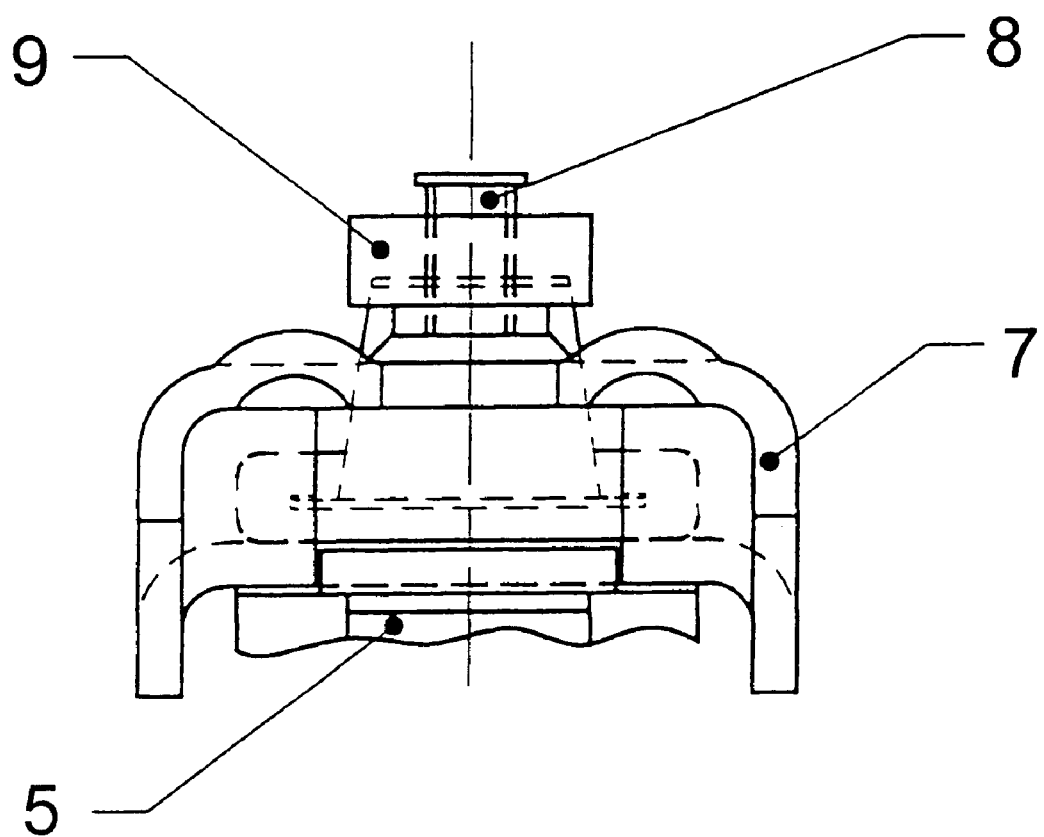
FIG. 2c shows a side view of the arrangement according to FIG. 2a from the left.

FIGS. 2a to 2c illustrate a preferred embodiment of a fixed bearing. According to FIG. 2a, a bolt 4 is fastened, e.g. adhesively bonded, in the border of the ceiling panel 1. Arranged over the bolt 4 is a damping ring 5 which is made of elastic material, for example of rubber, and damps the vibrations and noise. A load-bearing structure, for example a profile rail 6 of C-shaped cross-section, is connected to the fuselage in the longitudinal direction of the aircraft. The devices for fastening the bolts 4 are fastened in a known manner at the appropriate locations of the profile rail 6. In the exemplary embodiment illustrated, a bearing block 7 is fastened on the profile rail 6 with the aid of a screw 8, e.g. a countersunk head screw and a threaded catch 9. In order to avoid loosening of the connection as a result of vibrations, the thread of the catch 9 is preferably of self-locking design. In accordance with the number of bolts 4, the bearing blocks 7 are arranged fixedly along the profile rail 6. The other end of the bearing block 7 has a bore in which there is arranged a bushing 10 via which a turning lever 11 and a clamp 12 are connected to the bearing block. The bushing 10 can be secured against turning in the bearing block 7 by beads or the like (not illustrated). The bolt 4 is inserted through the hole in the bushing 10, it being possible to lock the bolt 4 to the bearing block 7 by a barb-like configuration of the free end of the bolt 4 and corresponding shaping of the clamp 12. In order to unlock the connection of the bolt 4 to the bearing block 7, the turning lever 11, with the clamp 12, is mounted rotatably. FIG. 2a also shows a side panel 2, which adjoins the ceiling panel 1 and is retained by the ceiling panel 1 by virtue of corresponding shaping. In order to avoid vibrations and noise, a spring 13 which is fastened on the bearing block 7 presses the side panel 2 onto the top side of the ceiling panel 1. In order to permit access to the turning lever 11 for the purpose of removing the ceiling panel 1, the side panel 2 is pushed outwards so as to release a gap between the ceiling panel 1 and the side panel 2, said gap permitting access to the turning lever 11. In order that it can better be seen, the turning lever 11 is marked with a conspicuous color, e.g. red.

In the plan view of FIG. 2b, the turning lever 11 is in the locked position. The closure can be unlocked by the turning lever 11 being turned through approximately 45° in the direction of the arrow A. For this purpose, the free end of the bolt 4 is shaped such that, when the turning lever 11 and the clamp 12 connected to it are turned, said clamp is automatically widened, with the result that the bolt 4 can be drawn out of the bushing 10 in the bearing block 7. In the case of a ceiling panel 1, when the turning lever 11 of each closure is turned into the unlocking position, said panel would swing downwards as a result of the force of gravity. This facilitates removal. In order to avoid damage to components, and injury to the servicing staff, as a result of the ceiling panel 1 swinging down too far, it is possible for retaining cables 15 to be fastened, by one end, on the bearing block 7 of the fixed bearing and, by their other end, on the ceiling panel 1. This means that, when the fixed bearings are open, the ceiling panel 1 is retained in a position which corresponds to the length of the, retaining cable 15. In order nevertheless to permit complete removal of the ceiling panel 1, the, or each, retaining cable 15 can be released quickly and easily without the use of tools. This can be achieved for example, as illustrated, by loops at the ends of the retaining cable 15 which are pushed over corresponding formations on the bearing block 7 and on the ceiling panel 1. In the case of trouble-shooting, all that is required is for the turning lever 11 of all the closures of the fixed-bearing side to be unlocked, the ceiling panel 1 to be swung down and the equipment located behind said panel to be inspected. If complete removal of the ceiling panel 1 is required, the bolts on the movable-bearing side have to be opened correspondingly (see FIGS. 4a to 4c), with the result that the entire ceiling panel 1 can be removed without the aid of tools. Furthermore, the embodiment illustrated provides a restoring spring 14 which acts on the turning lever 11 in the direction of the unlocked position (illustrated by dashed lines). While, when the ceiling panel 1 is properly connected to the load-bearing structure, i.e. when the bolts 4 are properly latched in, the turning lever 11 is in the locked position, the restoring spring 14 forces the turning lever 11 into the unlocked position (illustrated by dashed lines) when the bolt 4 has not been latched in. As a result, the proper connection of the fixed bearing is indicated by the position of the turning lever 11.

For the sake of completeness, FIG. 2c also shows a side view of the fixed bearing according to FIG. 2a from the left, the profile rail 6 not being illustrated.

Figure 3A:
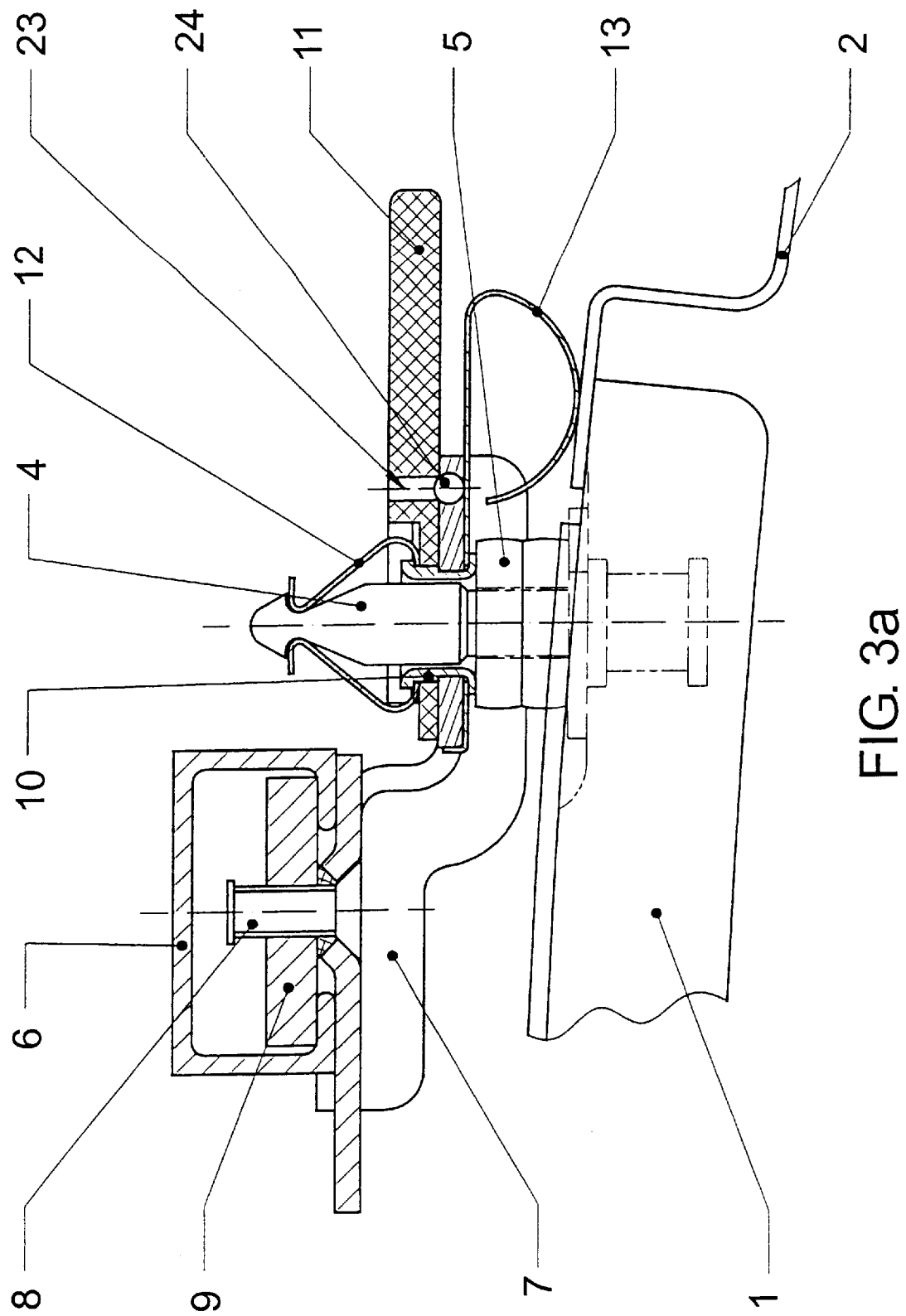
FIG. 3a shows another embodiment of a fixed bearing in vertical section.
Figure 3B:
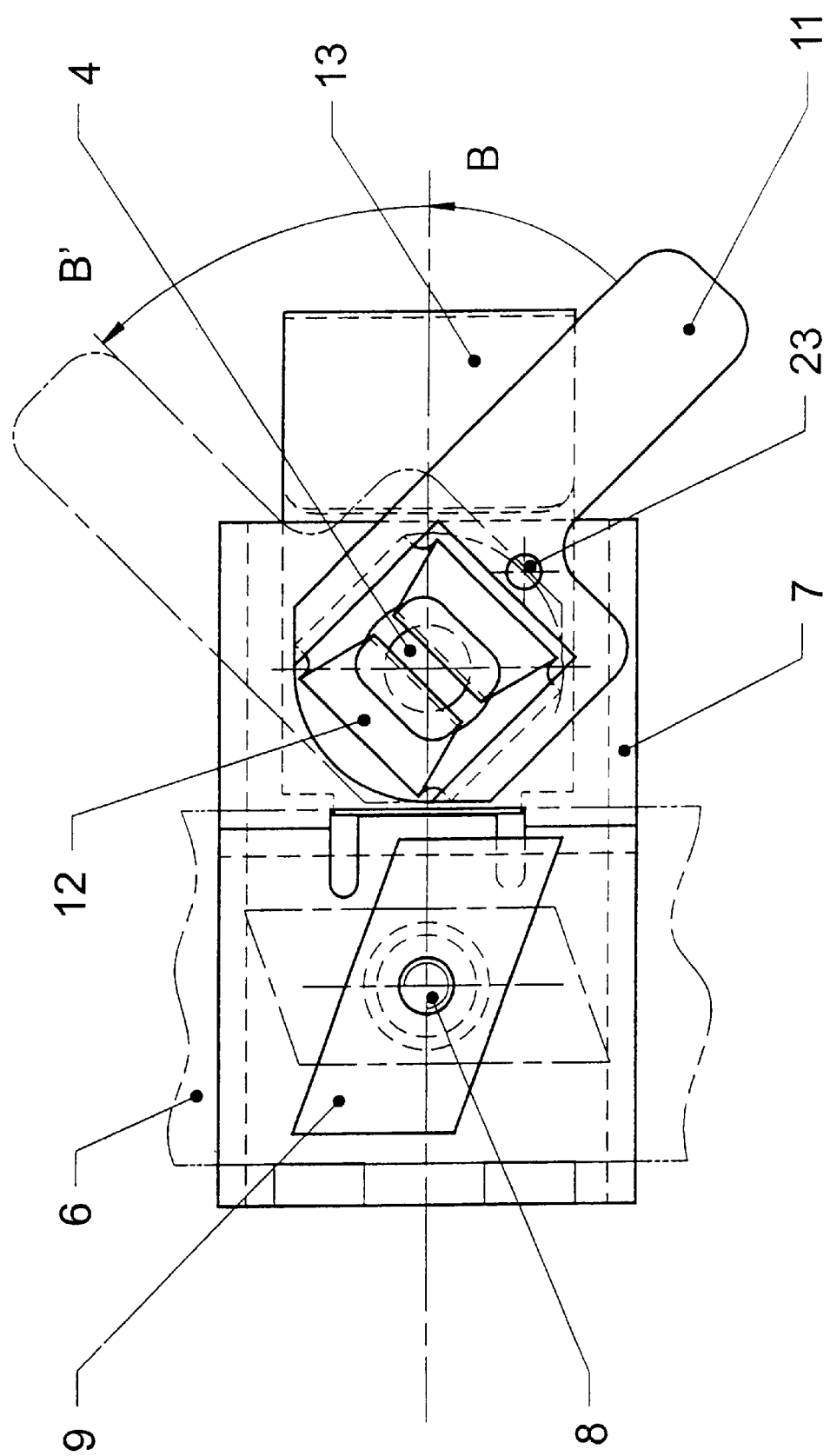
FIG. 3b shows the fixed bearing according to FIG. 3a in plan view.

FIGS. 3a and 3b illustrate another embodiment of a fixed bearing. Unlike the embodiment according to FIGS. 2a to 2c, this variant does not have a restoring spring. In contrast, this variant has retaining means for the purpose of protecting the turning lever 11 against undesired actuation.

As can be seen from the plan view according to FIG. 3b, the turning lever 11 is in the unlocked position. The closure is locked by virtue of the turning lever 11 being turned through approximately 45° in the direction of the arrow B. If the turning lever 11 is turned further, by approximately 45°, in the direction of the arrow B', the closure is unlocked again. Since the turning lever 11 can be unlocked in both directions from the locked position, removal of the ceiling panel 1 is facilitated since there is no need to take the turning direction of the turning lever 11 into account. In order to keep the turning lever 11 in the locked position, a ball-type fixing arrangement is provided, this comprising a hole 23 in the turning lever 11 and a ball 24, of which the diameter is greater than that of the hole 23. In the locked position of the turning lever 11, the ball 24 is pressed into the hole 23 by the spring 13. For unlocking, the force of the spring 13 has to be overcome, as a result of which the ball 24 is forced out of the hole 23 and the turning lever 11 can be moved into one of the unlocked positions.

Figure 4A:
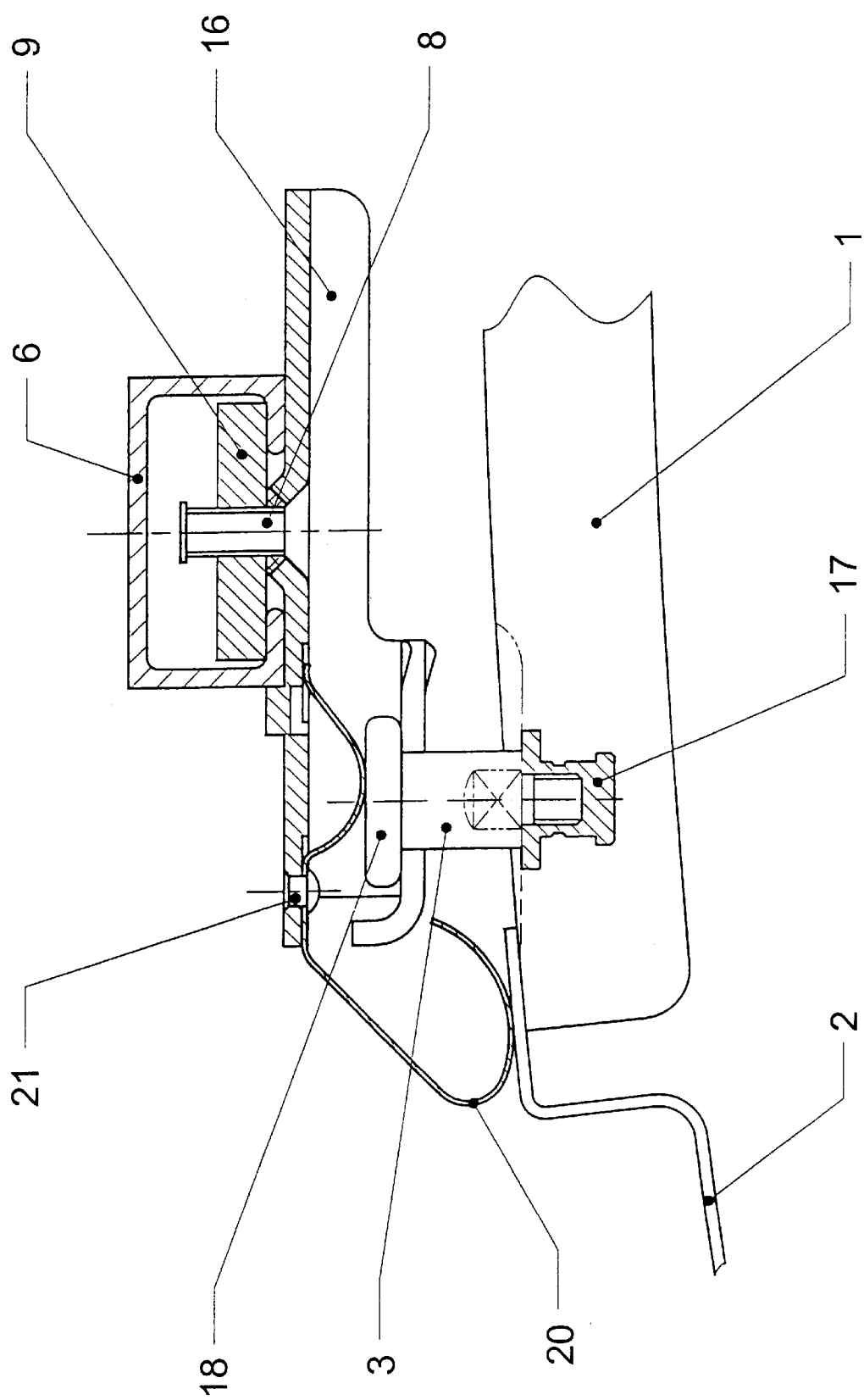
FIG. 4a shows an embodiment of a movable bearing in vertical section.
Figure 4B:
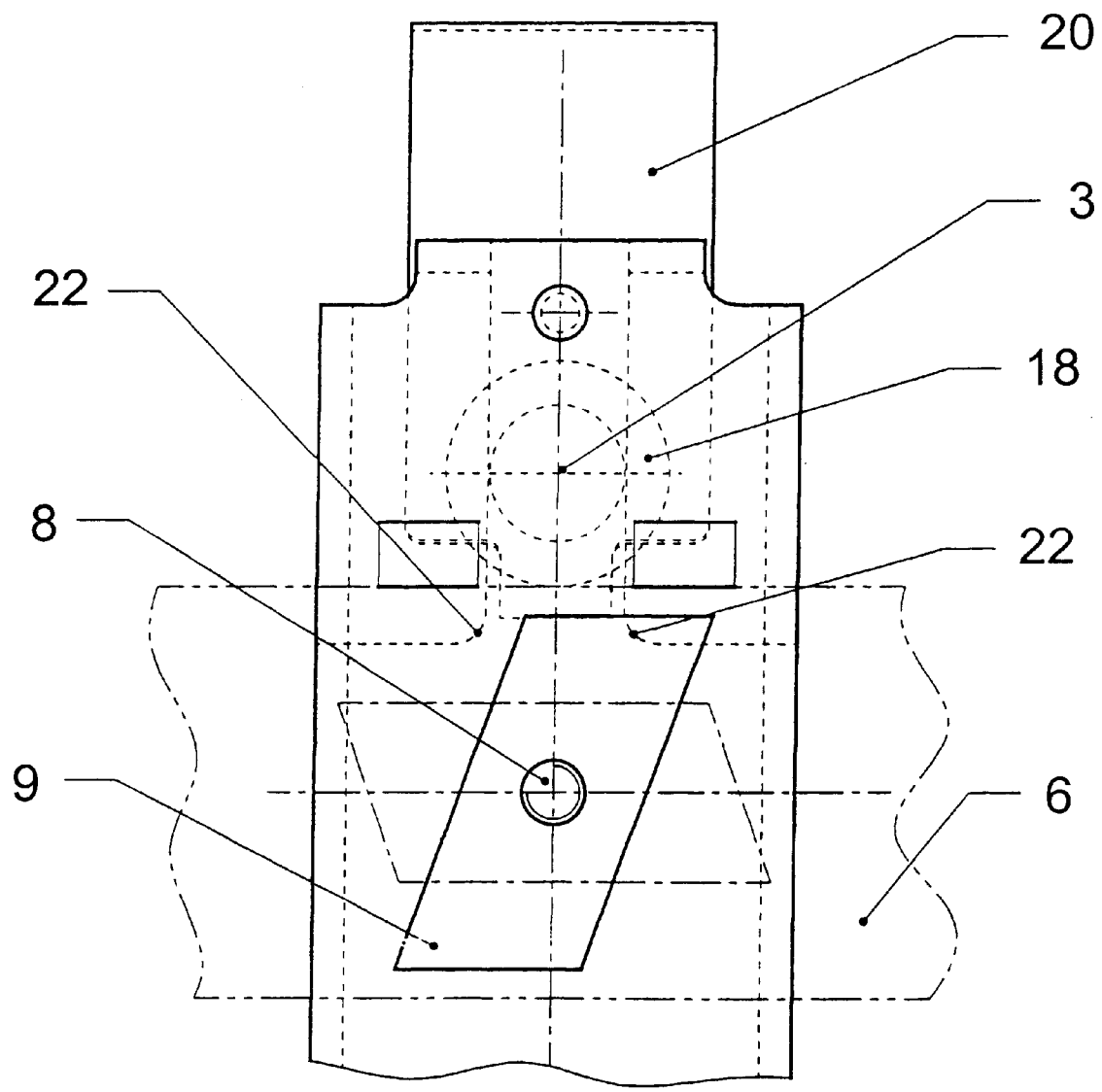
FIG. 4b shows the movable bearing according to FIG. 4a in plan view.
Figure 4C:
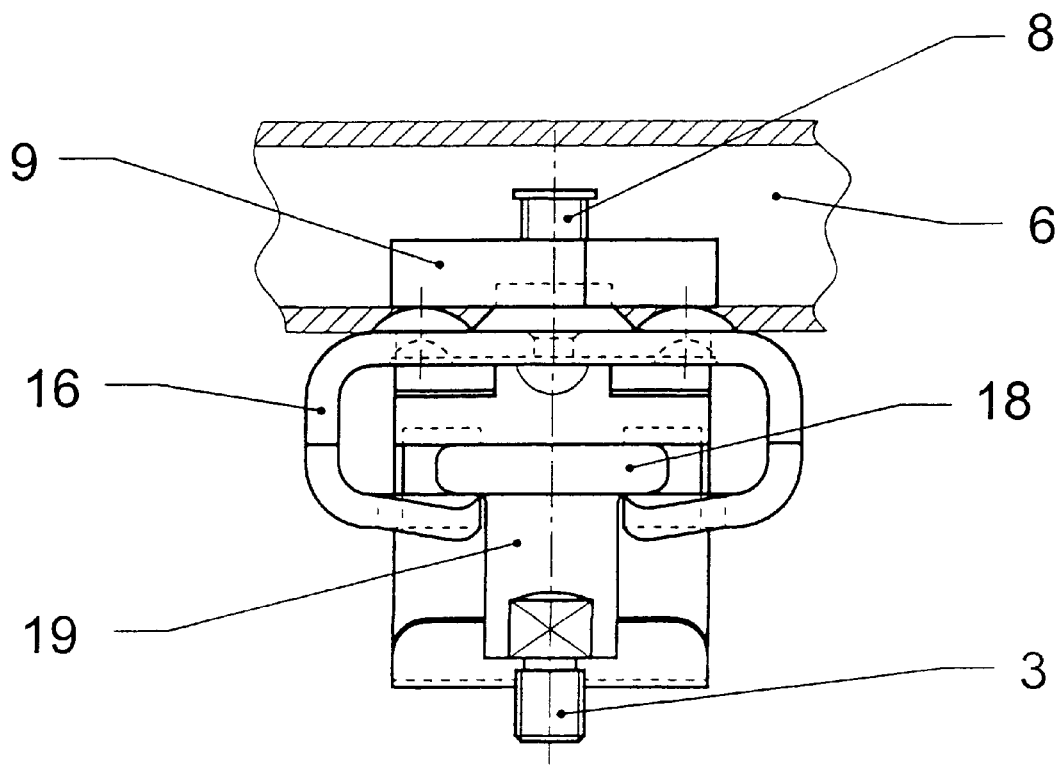
FIG. 4c shows a side view of the arrangement according to FIG. 4a from the right.

The embodiment of the movable bearing according to FIGS. 4a to 4c, in turn, comprises a bearing block 16 which, in the same way as the bearing block 7 for the fixed bearing, is fastened, with the aid of a screw 8, in this case for example an oval-head screw, and a catch 9, at locations of the profile strip 6 corresponding to the arrangement of the bolts 3 on the ceiling panel 1. The bolt 3 of the movable bearing is screwed into an insert 17, which is fixedly connected, for example adhesively bonded, to the ceiling panel 1. At its free end, which is directed away from the ceiling panel 1, the bolt 3 is provided with a head 18, which is greater than the diameter of the bolt 3. This allows the bolt 3 to be pushed into a corresponding slot 19 in the bearing block 16 (see FIG. 4*c*). The spring 20 is fastened, for example via a rivet 21, on the bearing block 16. The spring 20 has two functions. On the one hand, the head 18 of the bolt 3 is pressed against the bearing block and, on the other hand, a side panel 2 which, if need be, adjoins the ceiling panel 1 is pressed against the top side of the ceiling panel, in order to avoid vibrations in both cases. As can be seen in FIG. 4*b*, the slot 19 in the bearing block 16 is widened toward the outside by rounded formations 22 on both sides, in order to facilitate introduction of the bolts 3 into the slot. The view according to FIG. 4*c* shows the slot 19 in the bearing block 16, the bolt 3 being pushed into said slot and being retained in the bearing block 16 as a result of the head 18.

Those embodiments for fastening a ceiling panel according to the invention which are illustrated in the figures are only examples. Other embodiments are, of course, also conceivable for realizing the movable bearing and fixed bearing. Furthermore, the invention can also be used for side-wall elements or floor elements as well as in sectors other than aircraft construction, for example in vehicles or in shipping.

What is claimed is:

1. Device for releasably fastening a covering panel comprising a combination of a covering panel, a load-bearing structure, and at least two fastening elements on the load-bearing structure, wherein all the constituent parts of the fastening elements are connected to one of the covering panel and the load-bearing structure and wherein all constituent parts of the fastening elements which are connected to the covering panel are arranged exclusively on that side of the covering panel which is directed toward the load-bearing structure and wherein at least one fastening element is designed as a movable bearing for absorbing the forces which act essentially perpendicularly with respect to the covering panel and wherein at least one fastening element is designed as a fixed bearing for additionally absorbing the forces which act essentially in a plane defined by the covering panel and wherein said at least one fastening element which is designed as the fixed bearing has means for tool-free locking and unlocking.

2. Device according to claim 1, wherein all the fastening elements are arranged on the borders of the covering panel.

3. Device according to claim 2, wherein each fastening element which is designed as the movable bearing is arranged on one border side of the covering panel, and in that each fastening element which is designed as the fixed bearing is arranged on the opposite border side of the covering panel.

4. Device according to claim 1 wherein each fastening element which is designed as the movable bearing is formed by a bolt which is fixedly connected to the covering panel and suspended in a bearing block which is fixedly connected to the load-bearing structure, and wherein each fastening element which is designed as the fixed bearing is designed as a snap-action closure openable in a tool-free manner.

5. Device according to claim 4 wherein the fixed bearing, which is designed as the snap-action closure can be opened in a tool-free manner by a turning lever which is accessible from the side of the covering panel.

6. Device according to claim 5 wherein a restoring spring which acts on the turning lever and by means of which, in the open state of the snap-action closure, the turning lever can be moved into an unlocking position.

7. Device according to claim 5 wherein in order to protect against undesired actuation in the position in which the snap-action closure is locked, the turning lever has retaining means which can be overcome by pressure applied to the turning lever to enable the turning lever to be moved into a position in which the snap-action closure is unlocked.

8. Device according to claims 4 wherein at least one retaining cable is fastened, by one end in each case, on the covering panel or a component connected thereto and, by the other end in each case, on the load-bearing structure or a component connected thereto, said fastenings of each retaining cable being operable in a tool-free manner.

9. Device according to claim 1, wherein the fastening elements have means for damping vibrations.

10. Device according to claim 9 wherein said means for damping vibrations is elastic material mounted on said fastening elements.

11. Device according to claim 9 wherein said means for damping vibrations is a spring mounted on said fastening elements.

12. Device according to claim 1, wherein the fastening elements include means for releasably connecting the covering panel to adjoining covering panels.

13. Device according to claim 12 wherein the means for releasably connecting the covering panel to adjoining covering panels are formed by spring elements.

14. Device as defined in claim 1 wherein said covering panel includes an imperforate visible surface to improve esthetic appearance, facilitate cleaning and prevent unauthorized removal of the panel from the load bearing structure.

* * * * *